United States Patent
Kimura

(10) Patent No.: US 10,656,692 B2
(45) Date of Patent: May 19, 2020

(54) MEMORY SYSTEM

(71) Applicant: Toshiba Memory Corporation, Minato-ku (JP)

(72) Inventor: Naoki Kimura, Ebina (JP)

(73) Assignee: Toshiba Memory Corporation, Minato-ku (JP)

( * ) Notice: Subject to any disclaimer, the term of this patent is extended or adjusted under 35 U.S.C. 154(b) by 225 days.

(21) Appl. No.: 15/706,293

(22) Filed: Sep. 15, 2017

(65) Prior Publication Data

US 2018/0004267 A1    Jan. 4, 2018

Related U.S. Application Data

(63) Continuation of application No. 14/632,297, filed on Feb. 26, 2015, now abandoned.

(60) Provisional application No. 62/048,959, filed on Sep. 11, 2014.

(51) Int. Cl.
*G06F 1/26* (2006.01)
*G06F 3/06* (2006.01)

(52) U.S. Cl.
CPC ............ *G06F 1/266* (2013.01); *G06F 3/0625* (2013.01); *G06F 3/0635* (2013.01); *G06F 3/0655* (2013.01); *G06F 3/0688* (2013.01)

(58) Field of Classification Search
CPC ...... G06F 1/266; G06F 3/0625; G06F 3/0635; G06F 3/0655; G06F 3/0688
See application file for complete search history.

(56) References Cited

U.S. PATENT DOCUMENTS

| | | |
|---|---|---|
| 5,784,629 A | 7/1998 | Anderson |
| 7,830,732 B2 | 11/2010 | Moshayedi et al. |
| 8,473,760 B2 | 6/2013 | Takeyama et al. |
| 2009/0077408 A1* | 3/2009 | Wong .................. G06F 1/30 713/340 |
| 2010/0146333 A1 | 6/2010 | Yong et al. |
| 2013/0036320 A1 | 2/2013 | Yoshimura |
| 2013/0043929 A1 | 2/2013 | Chen |
| 2013/0127611 A1 | 5/2013 | Bernstein |
| 2013/0205065 A1 | 8/2013 | Kloeppner et al. |
| 2013/0254464 A1* | 9/2013 | Kimura ............... G06F 12/0246 711/103 |

FOREIGN PATENT DOCUMENTS

| | | |
|---|---|---|
| JP | 10-187302 | 7/1998 |
| JP | 2010-160654 | 7/2010 |
| JP | 2013-196494 | 9/2013 |

* cited by examiner

*Primary Examiner* — Austin Hicks
(74) *Attorney, Agent, or Firm* — Oblon, McClelland, Maier & Neustadt, L.L.P.

(57) ABSTRACT

According to one embodiment, a memory system includes a volatile memory, a power supply circuit, and a controller. The power supply circuit includes a first power supply path in which power supplied from a host device is supplied to the volatile memory, a second power supply path in which the power is supplied from the internal power supply to the volatile memory, and a switching device that switches between the first power supply path and the second power supply path. In response to an instruction for a transition to a low power consumption mode received from the host device, the controller outputs, to the switching device, an instruction to switch the power supply circuit from the first power supply path to the second power supply path.

19 Claims, 8 Drawing Sheets

MEMORY SYSTEM

CROSS-REFERENCE TO RELATED APPLICATIONS

This application is a continuation of U.S. application Ser. No. 14/632,297 filed Feb. 26, 2015 and is based upon and claims the benefit of priority from U.S. Provisional Application No. 62/048,959, filed on Sep. 11, 2014; the entire contents of each of which are incorporated herein by reference.

FIELD

Embodiments described herein relate generally to memory system.

BACKGROUND

A memory system having a volatile memory such as a DRAM built therein maintains data in the volatile memory by supplying power to the volatile memory from an external power supply.

However, there are cases where power cannot be supplied from an external power supply to the volatile memory such as a case where the memory system is operated in a low power consumption mode and a case where supply of power from an external power supply is cut off. In such cases, a structure for preventing loss of data stored in the volatile memory is necessary.

DETAILED DESCRIPTION

In general, according to one embodiment, a memory system includes a non-volatile memory, a volatile memory, an internal power supply, a power supply circuit, and a controller. The non-volatile memory temporarily stores data to be written into the non-volatile memory or data read from the non-volatile memory. The power supply circuit includes a first power supply path in which power supplied from a host device is supplied to the volatile memory, a second power supply path in which the power is supplied from the internal power supply to the volatile memory, and a switching device that switches between the first power supply path and the second power supply path. In response to an instruction for a transition to a low power consumption mode received from the host device, the controller outputs, to the switching device, an instruction to switch the power supply circuit from the first power supply path to the second power supply path.

Hereinafter, exemplary embodiments of the memory system will be explained below in detail with reference to the accompanying drawings. However, the present invention is not limited to the following embodiments.

First Embodiment

Figure 1:
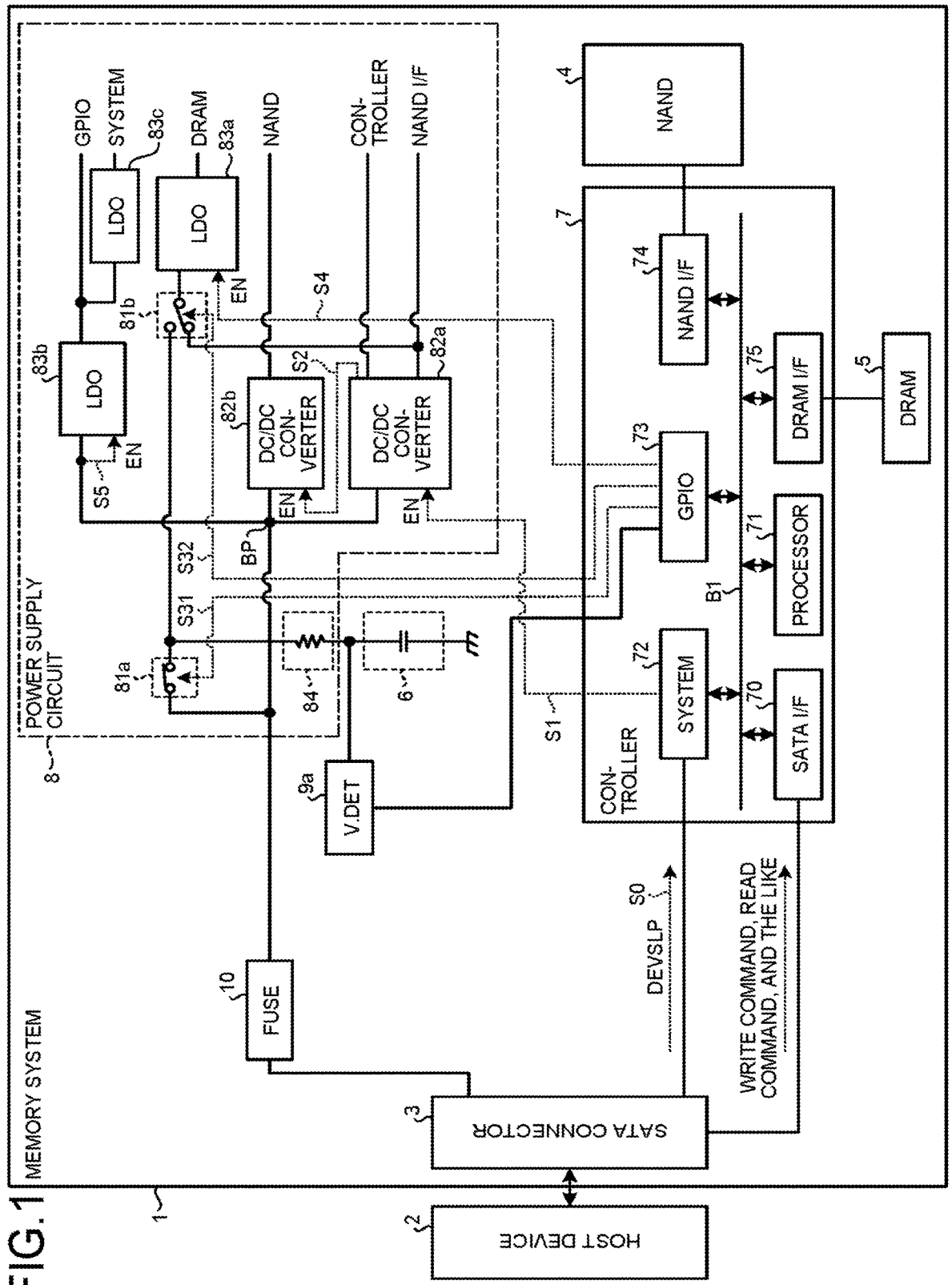
FIG. 1 is a block diagram that illustrates the configuration of a memory system according to a first embodiment.

FIG. 1 is a block diagram that illustrates the configuration of a memory system 1 according to a first embodiment. The memory system 1 serves as an external storage device of a host device 2. The memory system 1 includes: a serial ATA (SATA) connector 3 as a host interface; a NAND flash memory (hereinafter, referred to as a "NAND memory") 4 as a non-volatile memory; a DRAM 5 as a volatile memory; a capacitor 6 as an internal power supply; a controller 7; a power supply circuit 8; a voltage detector (hereinafter, referred to as a "VDET") 9a; and a fuse 10. The SATA connector 3 is connected to an SATA I/F 70 of the controller 7, performs a process according to an interface standard for the host device 2, and outputs a read command, a write command, user data and the like received from the host device 2 to the SATA I/F 70. In addition, the SATA connector 3 transmits user data read from the NAND memory 4, a response from the controller 7, and the like to the host device 2.

Figure 2:
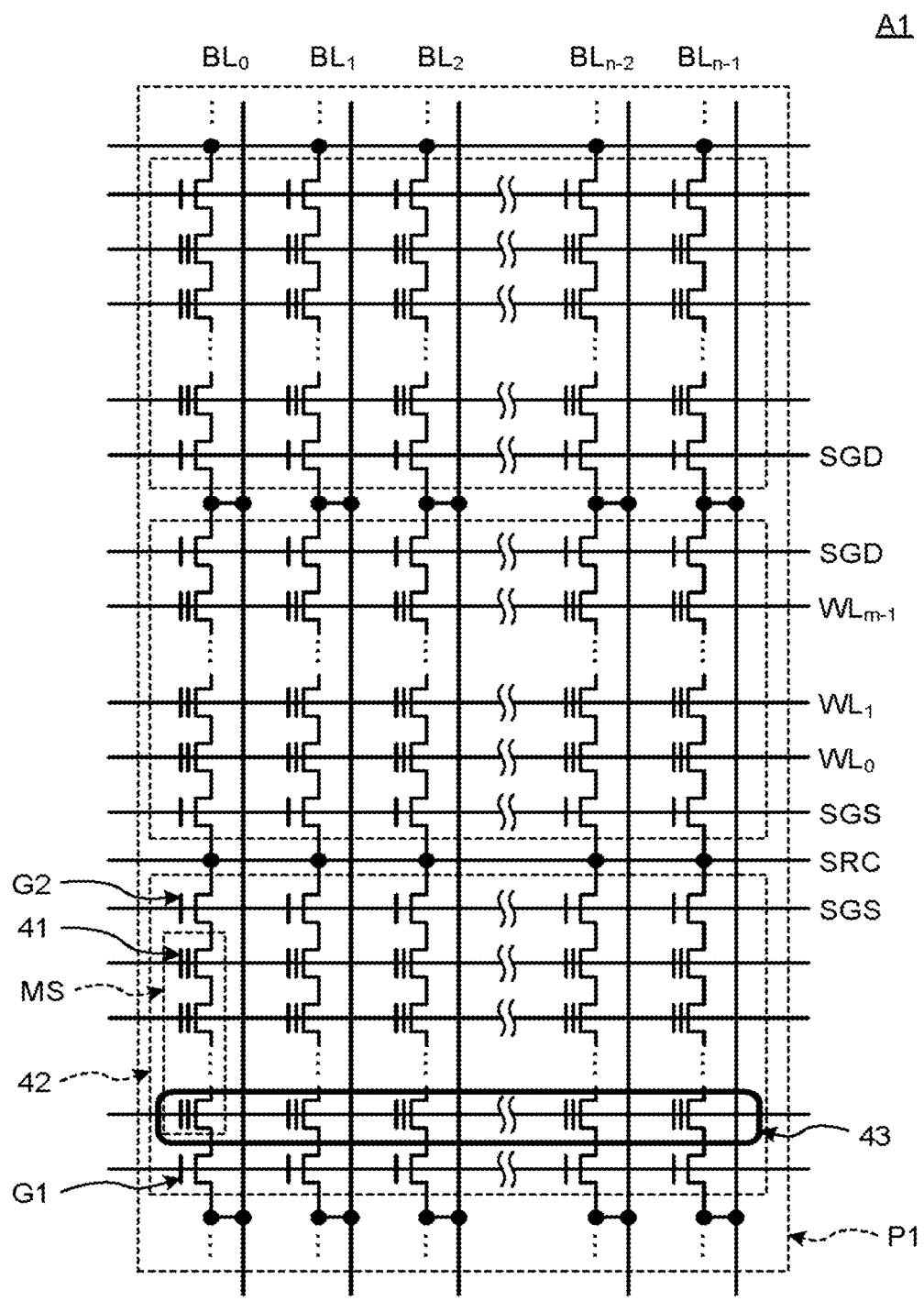
FIG. 2 is a diagram that illustrates the configuration of a memory cell array.

The NAND memory 4 is configured by one or more memory chips each having a memory cell array A1 illustrated in FIG. 2. The memory cell array A1 is a NAND cell-type memory cell array and is configured to include a plurality of NAND cells in which the plurality of memory cells 41 are arranged in a matrix pattern. One NAND cell is configured by a memory string MS that is formed by the memory cells 41 connected in series and selection gates G1 and G2 that are connected to both ends thereof. The selection gate G1 is connected to bit lines $BL_0$ to $BL_{n-1}$, and the selection gate G2 is connected to a source line SRC. Control gates of the memory cells 41 arranged in the same row are connected to word lines $WL_0$ to $WL_{m-1}$ so as to be common thereto. In addition, the first selection gate G1 is commonly connected to a selection line SGD, and the second selection gate G2 is commonly connected to a selection line SGS.

The memory cell array A1 includes one or more planes P1. Each plane P1 includes a plurality of blocks 42. Each block 42 is configured by a plurality of NAND cells and is a unit for data deletion. In addition, a plurality of memory cells 41 connected to one word line configure one physical sector 43. Data is written and read for each physical sector 43. In the case of a two bits/cell writing system (quad values), in one physical sector 43, for example, data corresponding to two pages is stored. On the other hand, in the case of a one bit/cell writing system (binary values), in one physical sector 43, for example, data corresponding to one page is stored. In addition, in the case of a three bits/cell writing system (eight values), in one physical sector 43, for example, data corresponding to three pages is stored. When a read operation, a program verification operation, or a program operation is performed, one word line is selected in accordance with a physical address received from the NAND I/F 74 of the controller 7, whereby the physical sector 43 is selected. The conversion of a page into the physical sector 43 is performed using the physical address.

The memory system 1 illustrated in FIG. 1, instead of the NAND memory 4, may include a magnetoresistive random access memory (MRAM) or a resistance random access memory (ReRAM) as the non-volatile memory.

The DRAM 5 serves as a transmission buffer for writing data and read data between the host device 2 and the NAND memory 4 and serves as a storage area of various kinds of management table data (hereinafter, referred to as "management data"). The management data is used for controlling the transmission of writing data and read data between the host device 2 and the NAND memory 4. The management data, for example, includes mapping information that represents relation between a logical address designated by the host device 2 and a storage position (physical address) on the NAND memory 4. The DRAM 5, in order to maintain data, needs a refreshing operation rewriting (charging capacitors configuring the DRAM 5) the data on a regular basis. The memory system 1, instead of the DRAM 5, may include a static random access memory (SRAM) as the volatile memory.

The controller 7 controls a write command and a read command transmitted from the host device 2. The controller 7 includes: a SATA interface (hereinafter, referred to as a "SATA I/F") 70; a processor 71; a system 72 (logic circuit) and a general purpose input output (GPIO) 73 as interfaces; a NAND interface (hereinafter, referred to as a "NAND I/F") 74; a DRAM interface (hereinafter, referred to as a "DRAM I/F") 75; and an internal bus B1. The SATA I/F 70, the processor 71, the system 72, the GPIO 73, the NAND I/F 74, and the DRAM I/F 75 are interconnected through the internal bus B1. The SATA I/F 70 is connected to the SATA connector 3, converts a write command, a read command, or the like, which is transmitted from the host device 2, received through the SATA connector 3 into an internal signal of the controller 7, and outputs the internal signal to the internal bus B1. In addition, the SATA I/F 70 converts a command or the like received from the inside of the controller 7 through the internal bus B1 into an external signal of the controller 7, and transmits the external signal to the SATA connector 3.

When a write command transmitted from the host device 2 is received through the SATA I/F 70 and the internal bus B1, the processor 71 uses the DRAM 5 as a buffer for writing data and writes the writing data into the NAND memory 4 based on the write command, management data stored in the DRAM 5, and the like. When a read command transmitted from the host device 2 is received through the SATA I/F 70 and the internal bus B1, the processor 71 reads data from the NAND memory 4 based on the read command, the management data stored in the DRAM 5, and the like and transmits the read data to the host device 2 using the DRAM 5 as a buffer for the read data.

The system 72 is connected to the SATA connector 3 in addition to the internal bus B1 and, as will be described later, controls the power supply circuit 8. In addition, the GPIO 73, as will be described later, controls the power supply circuit 8. The NAND I/F 74 directly controls writing data into the NAND memory 4 and reading data from the NAND memory 4 based on a command transmitted from the processor 71. The DRAM I/F 75 directly controls wiring data into the DRAM 5 and reading data from the DRAM 5 based on a command transmitted from the processor 71.

The capacitor 6 can supply power to the DRAM 5 through the power supply circuit 8. The capacitor 6 is charged by receiving supply of power from any other power supply. In the first embodiment, the static capacitance of the capacitor 6, for example, is about 0.01 to 0.047 (F).

The power supply circuit 8 is connected to the host device 2 through the SATA connector 3 and the fuse 10 and receives the supply of power from the host device 2 in a series of flow (in order of the host device 2=>the SATA connector 3=> the fuse 10=> the power supply circuit 8) illustrated in FIG. 1. In addition, the power supply circuit 8 is also connected to the NAND memory 4, the DRAM 5, the capacitor 6, and the controller 7 and can supply the power delivered from the host device 2 to the NAND memory 4, the DRAM 5, the capacitor 6, and the controller 7. In this way, in the example illustrated in FIG. 1, the host device 2 serves as an external power supply for the memory system 1. Hereinafter, the power supply circuit 8 is assumed to be in a state (power supply steady state) in which power is supplied from the host device 2 unless otherwise mentioned. In addition, the power supply circuit 8 can supply power from the capacitor 6 to the DRAM 5.

The power supply circuit 8 includes: switching devices 81a and 81b; DC/DC converters 82a and 82b; low drop-outs (LDO) 83a to 83c; and an input resistor 84.

The switching device 81a, as illustrated in FIG. 1, is interposed between the capacitor 6 and the SATA connector 3. The switching device 81a, in an On state illustrated in FIG. 1, connects the capacitor 6 and the SATA connector 3. To the contrary, the switching device 81a, in an Off state, causes the capacitor 6 and the SATA connector 3 not to be connected to each other.

The switching device 81b, as illustrated in FIG. 1, is interposed between the capacitor 6, the DC/DC converter 82a, and the LDO 83a. The switching device 81b, in a first switching state illustrated in FIG. 1, connects the DC/DC converter 82a and the LDO 83a and causes the capacitor 6 and the LDO 83a not to be connected to each other. To the contrary, the switching device 81b, in a second switching state not illustrated in FIG. 1, causes the DC/DC converter 82a and the LDO 83a not to be connected to each other and connects the capacitor 6 and the LDO 83a.

The DC/DC converter 82a is connected to the SATA connector 3 through the fuse 10. The DC/DC converter 82a monitors the level of an enable signal (hereinafter, referred to as an "EN signal") S1 to be described later and is switched between a conductive state and a non-conductive state in accordance with the level of the EN signal S1. The DC/DC converter 82a, in the conductive state, supplies power delivered from the host device 2 to the NAND I/F 74, each component (the processor 71, the DRAM I/F 75, and the like; here, the system 72, the GPIO 73, and the NAND I/F 74 are excluded; hereinafter, referred to as "the other components") of the controller 7, and the LDO 83a. This DC/DC converter 82a converts the output voltage of the host device 2 into a predetermined voltage that is required for the NAND I/F 74 and the other components of the controller 7 and outputs the predetermined voltage. In addition, the DC/DC converter 82a, in the non-conductive state, cuts off the supply of power delivered from the host device 2 to the NAND I/F 74, the other components of the controller 7, and the LDO 83a.

The DC/DC converter 82b is connected to the SATA connector 3 through the fuse 10. The DC/DC converter 82b monitors the level of an EN signal S2 to be described later and is switched between a conductive state and a non-conductive state in accordance with the level of the EN signal S2. The DC/DC converter 82b, in the conductive state, supplies power delivered from the host device 2 to the NAND memory 4. This DC/DC converter 82b converts the output voltage of the host device 2 into a predetermined voltage that is required for the NAND memory 4 and outputs the predetermined voltage. In addition, the DC/DC converter 82*b*, in the non-conductive state, cuts off the supply of power delivered from the host device 2 to the NAND memory 4.

The LDO 83*a* is connected to the capacitor 6 and the DC/DC converter 82*a* through the switching device 81*b*. The LDO 83*a* monitors the level of an EN signal S4 to be described later and is switched between a conductive state and a non-conductive state in accordance with the level of the EN signal S4. The LDO 83*a*, in the conductive state, supplies power delivered from the host device 2 or power supplied from the capacitor 6 to the DRAM 5 through the DC/DC converter 82*a* in accordance with switching of the switching devices 81*a* and 81*b*. The LDO 83*a* converts the output voltage of the DC/DC converter 82*a* and the output voltage of the capacitor 6 into a predetermined voltage that is required for the DRAM 5 and outputs the predetermined voltage. In addition, the LDO 83*a*, in the non-conductive state, cuts off the supply of power delivered from the host device 2 or the capacitor 6 to the DRAM 5.

The LDO 83*b* is connected to the SATA connector 3 through the fuse 10. The LDO 83*b* monitors the level of an EN signal S5 to be described later and is switched between a conductive state and a non-conductive state in accordance with the level of the EN signal S5. The LDO 83*b*, in the conductive state, supplies power delivered from the host device 2 to the GPIO 73 and the LDO 83*c*. The LDO 83*b* converts the output voltage of the host device 2 into a predetermined voltage that is required for the GPIO 73 and outputs the predetermined voltage. In addition, the LDO 83*b*, in the non-conductive state, cuts off the supply of power delivered from the host device 2 to the GPIO 73 and the LDO 83*c*, Furthermore, the DC/DC converters 82*a* and 82*b* and the LDO 83*b* are connected to a branch point BP and are connected to the fuse 10 through the branch point BP.

The LDO 83*c* is connected to the SATA connector 3 through the LDO 83*b* and the fuse 10. The LDO 83*c*, in the conductive state, supplies power delivered from the host device 2 through the LDO 83*b* to the system 72. This LDO 83*c* converts the output voltage of the LDO 83*b* into a predetermined voltage required for the system 72 and outputs the predetermined voltage.

An input resistor 84 is connected to the capacitor 6 in series and suppresses a current input to the capacitor 6 when the capacitor 6 is charged.

A V.DET 9*a* is connected between the input resistor 84 of the power supply circuit 8 and the capacitor 6, monitors the output voltage of the capacitor 6, and outputs a result of the monitoring to the GPIO 73.

The fuse 10 is interposed between the SATA connector 3 and the power supply circuit 8 and blows so as to protect the power supply circuit 8 in a case where an excessive current is supplied from the host device 2.

In a state in which the transmission of writing data and read data between the host device 2 and the NAND memory 4 is completed, as a low power consumption instruction (device sleep (DEVSLP) instruction) is received from the host device 2, the memory system 1 transits to a low power consumption mode (DEVSLP mode) in which the supply of power from the host device 2 for the operation is suppressed, for example to be 5 (mW) or less. The SATA connector 3 outputs a DEVSLP signal S0 for switching the memory system 1 between the DEVSLP mode and a normal mode (a state in which the DEVSLP mode is disabled) to the system 72. When a DEVSLP instruction is received from the host device 2, the SATA connector 3 switches the DEVSLP signal S0 to a high level. When a DEVSLP mode disabling signal is received from the host device 2, the SATA connector 3 switches the DEVSLP signal S0 to a low level.

Figure 3:
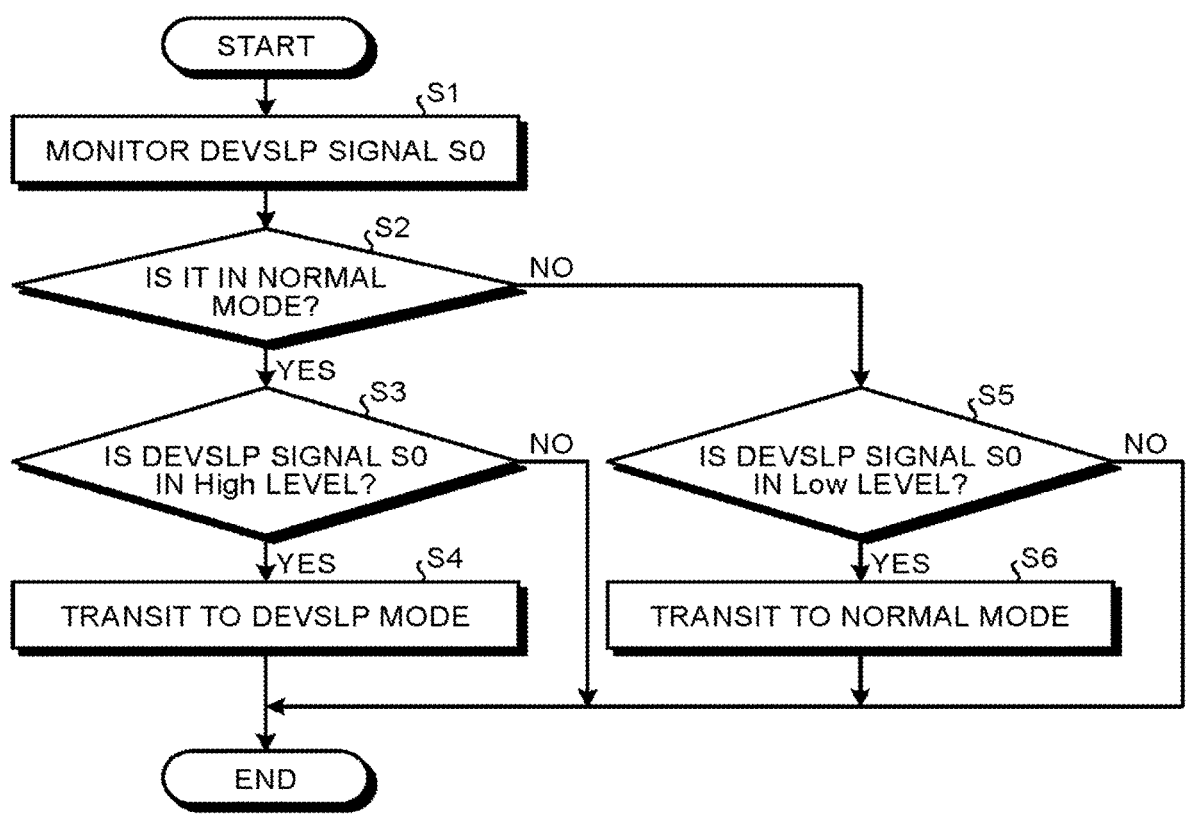
FIG. 3 is a flowchart that illustrates switching between a normal mode and a DEVSLP mode of the memory system.

FIG. 3 is a flowchart that illustrates switching between the normal mode and the DEVSLP mode of the memory system 1. The system 72 illustrated in FIG. 1 monitors the DEVSLP signal S0 transmitted from the SATA connector 3 at a predetermined interval in Step S1 and determines whether or not the memory system 1 is in the normal mode based on the level of the DEVSLP signal S0 in Step S2. In a case where the DEVSLP signal S0 is in the low level, the system 72 determines that the memory system 1 is in the normal mode (Yes in Step S2) and monitors whether or not the DEVSLP signal S0 is switched to the high level in Step S3. Then, when the DEVSLP signal S0 is switched to the high level, the system 72 executes a transition from the normal mode to the DEVSLP mode in Step S4. On the other hand, in Step S3, in a case where the DEVSLP signal S0 is determined to be in the low level without being switched to the high level (No in Step S3), the system 72 does not execute the transition to the DEVSLP mode. In addition, in Step S2, in a case where the DEVSLP signal S0 is in the high level, the system 72 determines the memory system 1 to be not in the normal mode but in the DEVSLP mode (No in Step S2) and monitors whether or not the DEVSLP signal S0 is switched to the low level in Step S5. Then, when the DEVSLP signal S0 is switched to the low level (Yes in Step S5), the system 72 executes a transition from the DEVSLP mode to the normal mode in Step S6. On the other hand, in Step S5, in a case where the DEVSLP signal S0 is determined to be in the high level without being switched to the low level (No in Step S5), the system 72 does not execute a transition from the DEVSLP mode to the normal mode.

The system 72 illustrated in FIG. 1 outputs an EN signal S1 switched between the high level and the low level to the DC/DC converter 82*a* and, when the DEVSLP signal S0 is switched from the low level to the high level (corresponding to Yes in Step S3 illustrated in FIG. 3), the system 72 switches the EN signal S1 to the low level. The DC/DC converter 82*a* outputs an EN signal S2 switched between the high level and the low level to the DC/DC converter 82*b* and, when an EN signal S1 is switched to the low level, switches the EN signal S2 to the low level and transits to the non-conductive state, thereby cutting out the supply of power from the host device 2 to the NAND I/F 74 and the other components of the controller 7. When the EN signal S2 is switched to the low level, the DC/DC converter 82*b* transits to the non-conductive state, thereby cutting off the supply of power from the host device 2 to the NAND memory 4. Here, the EN signal S2 may be configured to be directly output from the system 72 to the DC/DC converter 82*b*.

The GPIO 73 outputs control signals S31 and S32 switched between the high level and the low level to the switching devices 81*a* and 81*b*. When the DEVSLP signal is switched from the low level to the high level (corresponding to Yes in Step S3 illustrated in FIG. 3), the system 72 switches the control signals S31 and S32 from the high level to the low level. When the control signal S31 is switched to the low level, the switching device 81*a* is switched from the On state illustrated in FIG. 1 to the Off state. When the control signal S32 is switched to the low level, the switching device 81*b* is switched from the first switching state illustrated in FIG. 1 to a second switching state. When these switching devices 81*a* and 81*b* are switched to the Off state or the second switching state, the capacitor 6 and the LDO 83*a* are connected to each other, and accordingly, the LDO 83*a* receives the supply of power from the capacitor 6. Even when the memory system 1 transits to the DEVSLP mode, the LDO 83*a* maintains to be in the conductive state, and accordingly, the DRAM 5 receives supply of power from the capacitor 6. Accordingly, when the transition to the DEVSLP mode is made, the power supply source of the DRAM 5 is switched from the host device 2 to the capacitor 6. As long as the supply of power is continued from the capacitor 6, the DRAM 5 performs a refreshing operation using the power and continues to maintain the management data, whereby loss of the data in the DEVSLP mode can be prevented.

Even when the memory system 1 transits to the DEVSLP mode, the LDO's 83*b* and 83*c* maintain the conductive state. Accordingly, the system 72 and the GPIO 73 receive the supply of power from the host device 2 through the LDO's 83*b* and 83*c*.

As described above, when the DEVSLP signal S0 is switched from the high level to the low level (corresponding to Yes in Step S5 illustrated in FIG. 3), the system 72 causes the memory system 1 to transit from the DEVSLP mode to the normal mode (corresponding to Step S6 illustrated in FIG. 3). At this time, the system 72 and the GPIO 73 perform a control process that is reverse to the control process performed in the DEVSLP mode.

When the DEVSLP signal S0 is switched from the high level to the low level (corresponding to Yes in Step S5 illustrated in FIG. 3), the system 72 switches the EN signal S1 to the high level. When the EN signal S1 is switched to the high level, the DC/DC converter 82*a* transits to the conductive state, supplies power supplied from the host device 2 to the NAND I/F 74 and the other components of the controller 7, and switches the EN signal S2 to the high level. When the EN signal S2 is switched to the high level, the DC/DC converter 82*b* transits to the conductive state and supplies power supplied from the host device 2 to the NAND memory 4.

In addition, when the DEVSLP signal S0 is switched from the high level to the low level (corresponding to Yes in Step S5 illustrated in FIG. 3), the system 72 switches the control signals S31 and S32 output from the GPIO 73 from the low level to the high level. When the control signals S31 and S32 are switched to the high level, the switching devices 81*a* and 81*b* are switched from the Off state or the second switching state to the On state illustrated in FIG. 1 or the first switching state. When these switching devices 81*a* and 81*b* are switched to the On state illustrated in FIG. 1 or the first switching state, the capacitor 6 and the LDO 83*a* are in the non-conductive state, and the LDO 83*a* and the DC/DC converter 82*a* are connected to each other, whereby the LDO 83*a* receives the supply of power from the host device 2 through the DC/DC converter 82*a*.

When the memory system 41 transits to the normal mode, the switching device 81*a* is in the On state, and the capacitor 6 and the host device 2 are connected to each other. Accordingly, the capacitor 6 receives the supply of power from the host device 2 and is charged. According to such charging, the capacitor 6, in the DEVSLP mode, can recover the power that is reduced due to the supply of power to the DRAM 5.

Even when the memory system 1 transits to the normal mode, the LDO's 83*a* to 83*c* maintain the conductive state. Accordingly, even when the memory system 1 transits to the normal mode, the DRAM 5 receives the supply of power from the host device 2 through the LDO 83*a*. In addition, the system 72 and the GPIO 73 receive the supply of power from the host device 2 through the LDO's 83*b* and 83*c*.

In addition, the LDO's 83*a* and 83*b* can be caused to the non-conductive state in accordance with the EN signals S4 and S5. The EN signal S4 is output from the GPIO 73 and is switched between the high level and the low level. When the EN signal S4 is switched to the low level, the LDO 83*a* transits to the non-conductive state and cuts off the supply of power to the DRAM 5. The EN signal S5 is an input voltage of the LDO 83*b* and is switched between the high level and the low level in accordance with an input voltage. When the EN signal S5 is switched to the low level, the LDO 83*b* transits to the non-conductive state and cuts off the supply of power to the GPIO 73 and the LDO 83*c*. In order to return these LDO's 83*a* and 83*b* from the non-conductive state to the conductive state, the EN signals S4 and S5 may be switched to the high level.

Figure 4:
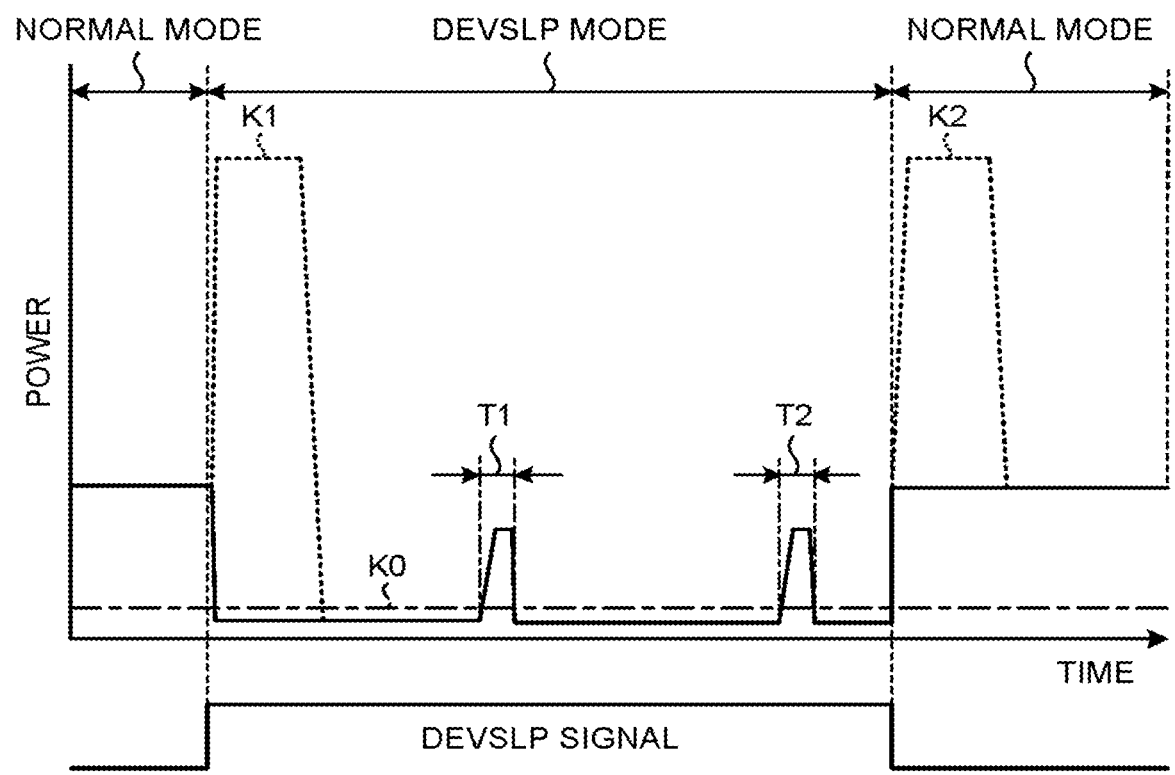
FIG. 4 is a diagram that illustrates power consumption in the normal mode and the DEVSLP mode of the memory system.

FIG. 4 is a diagram that illustrates power consumption in the normal mode and the DEVSLP mode of the memory system 1. In FIG. 4, the horizontal axis represents the time. In addition, the vertical axis represents power (power consumption of the memory system 1) supplied from the host device 2 to the memory system 1.

In the normal mode, the memory system 1, as described above, supplies power delivered from the host device 2 to the NAND memory 4, the DRAM 5, the capacitor 6, and the controller 7. Accordingly, the power consumption of the memory system 1 in the normal mode, for example, is about 50 to 100 (mW).

When a transition from the normal mode to the DEVSLP mode is made, the memory system 1, as described above, limits the supply of power from the host device 2 to the system 72 and the GPIO 73. Accordingly, the power consumption of the memory system 1 in the DEVSLP mode is lower than the power consumption of the memory system 1 in the normal mode, for example, to be 5 (mW) or less as represented by a dashed line K0 in FIG. 4.

In the DEVSLP mode, power is supplied from the capacitor 6 to the DRAM 5. However, when the remaining power of the capacitor 6 is lowered too much, there is a possibility that supply of power from the capacitor 6 to the DRAM 5 cannot be continued. Thus, the GPIO 73 illustrated in FIG. 1 receives a monitoring result of the output voltage of the capacitor 6 from the V.DET 9*a* and notifies the system 72 of the monitoring result. In a case where the output voltage is determined to be a threshold or less, the system 72 detects such a decrease in the remaining power, outputs a control signal (not illustrated in the figure) of the high level to the switching device 81*a* even in the DEVSLP mode, and turns on the switching device 81*a* so as to connect the host device 2 and the capacitor 6, thereby charging the capacitor 6. During the charging process, power is supplied from the host device 2 to the capacitor 6, and accordingly, even in the DEVSLP mode, the power consumption of the memory system 1 temporarily increases as denoted as periods T1 and T2 in FIG. 4.

As a comparative example, a case will be described in which, when the memory system 1 transits to the DEVSLP mode, management data stored in the DRAM 5 is copied to the NAND memory 4 so as to be stored therein, and thereafter, the supply of power from the host device 2 to the NAND memory 4, the DRAM 5, the NAND I/F 74, and the other components of the controller 7 is cut off. In the case of the comparative example, when the management data is copied, as denoted by a dotted line K1 in FIG. 4, power higher than the power consumed in the normal mode described above is temporarily consumed. In addition, in the case of the comparative example, when the memory system 1 is returned to the normal mode, it is necessary to copy the management data copied to the NAND memory 4 to the DRAM 5 again, and, also at this time, as denoted by a dotted line K2, power higher than the power consumed in the normal mode described above is consumed. In addition, since such a copy operation is stress for the NAND memory 4, in the case of the comparative example, there is a possibility that the life of the NAND memory 4 decreases.

According to the first embodiment, when transiting to the DEVSLP mode, the memory system 1 stops the supply of power from the host device 2 to the DRAM 5, the NAND memory 4, the NAND I/F 74, and the other components of the controller 7 and supplies power from the capacitor 6 to the DRAM 5. Accordingly, in order to suppress the power consumption of the host device 2, even when the supply of power from, the host device 2 to the DRAM 5 is cut off, the memory system 1 maintains the management data stored in the DRAM 5 continuously in the DRAM 5, whereby loss of the data can be prevented.

In addition, according to the first embodiment, even when transiting to the DEVSLP mode, the memory system 1 continuously maintains the management data stored in the DRAM 5 in the DRAM 5 without copying the management data to the NAND memory 4. Accordingly, differently from the comparative example, the memory system 1 does not consume much power according to the copying process. In addition, according to the memory system 1, differently from the comparative example, since stress according to the copying process is not applied to the NAND memory 4, a decrease in the life of the NAND memory 4 can be suppressed.

Second Embodiment

Figure 5:
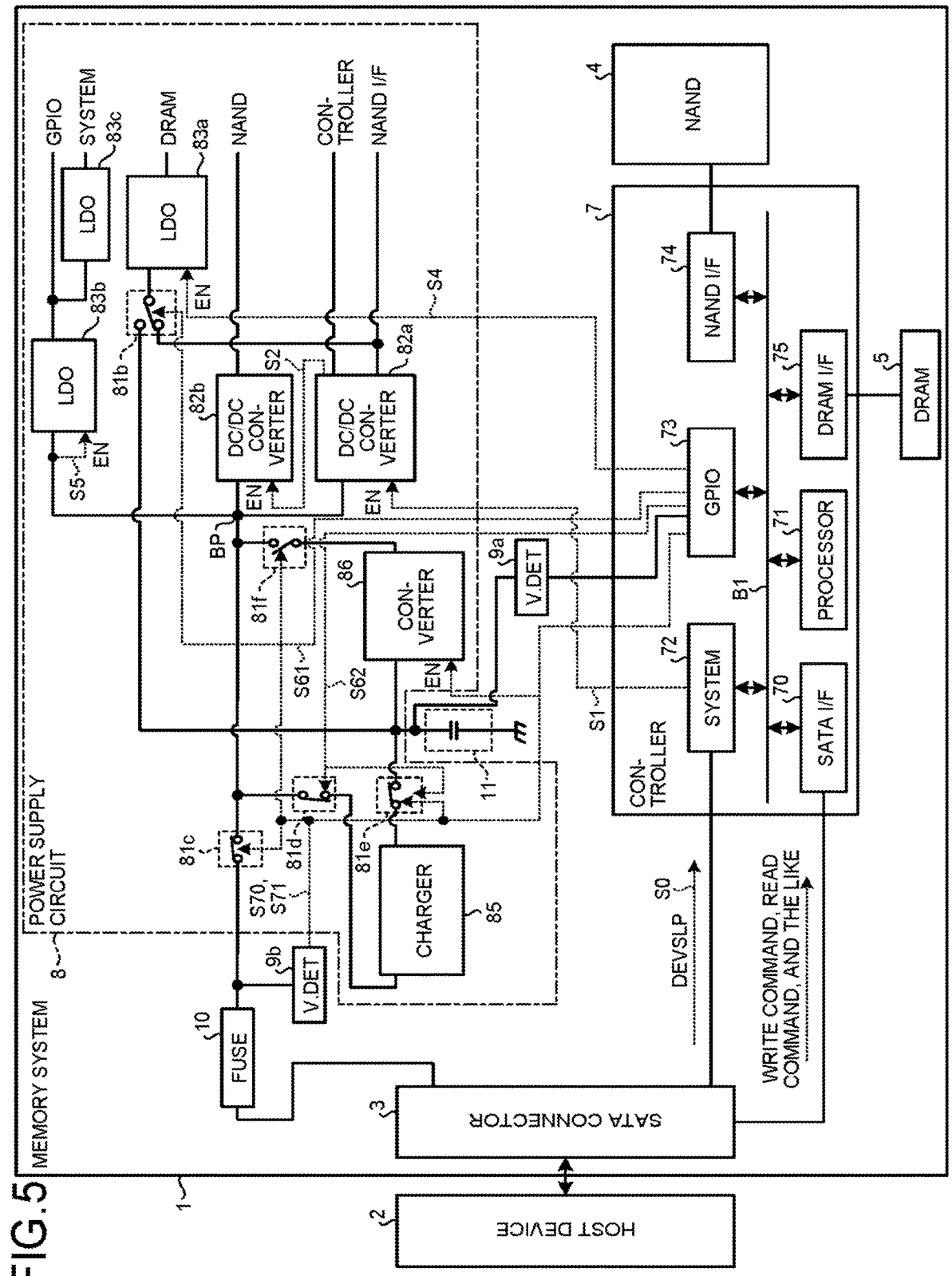
FIG. 5 is a block diagram that illustrates the configuration of a memory system according to a second embodiment.

FIG. 5 is a block diagram that illustrates the configuration of a memory system 1 according to a second embodiment. According to the second embodiment, the memory system 1 not only responds to a DEVSLP mode but appropriately protects data stored in a DRAM 5 even when a transition to a state in which the supply of power from an external power supply (host device 2) to a power supply circuit 8 is completely cut off is made. Hereinafter, the same reference numeral will be assigned to the same configuration as that of the first embodiment, and duplicate description thereof will not be presented.

As illustrated in FIG. 5, the memory system 1 according to the second embodiment includes a super capacitor 11 and a V.DET 9b. The super capacitor 11 serves as an internal power supply replacing the capacitor 6 according to the first embodiment. The super capacitor 11, for example, has static capacitance of about 1 (F) and has a power supply capability that is superior to the capacitor 6 according to the first embodiment as an internal power supply and has capacitance enabling writing data temporarily stored in the DRAM 5 and management data stored in the DRAM 5 to be copied to a NAND memory 4. The super capacitor 11 is charged by receiving supply of power from another power supply.

A V.DET 9b is connected between a fuse 10 and a power supply circuit 8 (between the fuse 10 and a switching device 81c to be described later), monitors an output voltage of the host device 2 for the power supply circuit 8, and transmits a monitoring result thereof to a GPIO 73. The V.DET 9b, based on the monitoring result, outputs a control signal S70 switched between the high level and the low level to switching devices 81c, 81e, and 81f to be described later and outputs an EN signal S71 switched between the high level and the low level to a converter 86 to be described later. The V.DET 9b controls the switching devices 81c, 81e, and 81f and the converter 86 using the control signal S70 and the EN signal S71.

The V.DET 9a according to the second embodiment is connected between the power supply circuit 8 and the super capacitor 11, monitors an output voltage of the super capacitor 11, and outputs a monitoring result thereof to the GPIO 73.

The power supply circuit 8 according to the second embodiment includes: switching devices 81c to 81f replacing the switching device 81a according to the first embodiment; a charger 85 replacing the input resistor 84; and newly the converter 86.

The switching device 81c is interposed in a first path. This first path is a section from the fuse 10 to a branch point BP. In the On state illustrated in FIG. 5, the switching device 81c connects DC/DC converters 82a and 82b and an LDO 83b to a SATA connector 3 through the fuse 10. To the contrary, in the Off state, the switching device 81c causes the DC/DC converters 82a and 82b and the LDO 83b not to be connected to the SATA connector 3.

Switching devices 81d to 81f are interposed in a second path. This second path is connected to the first path in parallel between the switching device 81c and the branch point BP. The switching devices 81d to 81f are in mutually-serial relation in the second path. In the second path, between the switching device 81d and the switching device 81e, the charger 85 is interposed. In the second path, between the switching device 81e and the switching device 81f, the converter 86 is interposed. In the second path, between the switching device 81e and the converter 86, a first electrode of the super capacitor 11 is connected.

In the On state, the switching device 81d, as illustrated in FIG. 5, connects the charger 85 to the first path. To the contrary, in the Off state, the switching device 81d causes the charger 85 not to be connected to the first path. In the On state illustrated in FIG. 5, the switching device 81e connects the charger 85 to the super capacitor 11 and the converter 86. To the contrary, in the Off state, the switching device 81e causes the charger 85 not to be connected to the super capacitor 11 and the charger 85. In the On state, the switching device 81f connects the super capacitor 11 to the first path through the converter 86. To the contrary, in the Off state as illustrated in FIG. 5, the switching device 81f causes the converter 86 and the super capacitor 11 not to be connected to the first path.

In a first switching state illustrated in FIG. 5, the switching device 81b connects the DC/DC converter 82a and the LDO 83a and causes the super capacitor 11 and the LDO 83a not to be connected to each other. To the contrary, in a second switching state not illustrated in FIG. 5, the switching device 81b causes the DC/DC converter 82a and the LDO 83a not to be connected to each other and connects the super capacitor 11 and the LDO 83a.

The charger 85 is connected to the super capacitor 11 through the switching device 81e. The charger 85 improves the charging efficiency of the super capacitor 11 by controlling the charging of the super capacitor 11.

The converter 86 is connected to the super capacitor 11 and performs control such that the output voltage of the super capacitor 11 is the same as the output voltage of the host device 2 and outputs the output voltage. The converter 86 monitors the level of the EN signal S71 and is switched between a conductive state and a non-conductive state in accordance with the level of the EN signal S71. In the conductive state, the converter 86 outputs power supplied from the super capacitor 11 to the DC/DC converters 82a and 82b and the LDO 83b. To the contrary, in the non-conductive state, the converter 86 cuts off such an output.

When the memory system 1 according to the second embodiment transits to the DEVSLP mode, the DC/DC converters 82a and 82b, similar to the first embodiment, transits to the non-conductive state in accordance with EN signals S1 and S2 of the low level.

The GPIO 73 outputs a control signal S61 that is switched between the high level and the low level to the switching device 81b. In addition, the GPIO 73 outputs a control signal S62 that is switched between the high level and the low level to the switching devices 81d and 81e. When the memory system 1 transits to the DEVSLP mode, a system 72 switches the switching devices 81b, 81d, and 81e from the On state illustrated in FIG. 5 or the first switching state to the Off state or the second switching state by switching the control signals S61 and S62 output from the GPIO 73 to the low level.

When these switching devices 81b, 81d, and 81e are switched to the Off state or the second switching state, the super capacitor 11 and the LDO 83a are connected, and the LDO 83a receives the supply of power from the super capacitor 11. Accordingly, the power supply source of the DRAM 5 that receives the supply of power through the LDO 83a is switched from the host device 2 to the super capacitor 11. As long as the supply of power from the super capacitor 11 is received, the DRAM 5 performs a refreshing operation using the supplied power and continuously maintains management data, thereby preventing loss of the management data in the DEVSLP mode.

Even in the DEVSLP mode, since the switching device 81c is controlled to be in the On state, the system 72 and the GPIO 73 receives supply of power from the host device 2 through the LDO's 83b and 83c. In addition, in the DEVSLP mode, the switching device 81f is controlled to be in the Off state illustrated in FIG. 5. Furthermore, in the DEVSLP mode, the DC/DC converters 82a and 82b, similar to the first embodiment, are in the non-conductive state, and, even when being connected to the host device 2 or the super capacitor 11, the DC/DC converters 82a and 82b cuts off power supplied from the host device 2 and the super capacitor 11 to the NAND memory 4, the NAND I/F 74, the LDO 83a, and the other components of the controller 7.

In the DEVSLP mode, when the remaining power of the super capacitor 11 for the DRAM 5 is lowered too much, there is a possibility that supply of power from the super capacitor 11 to the DRAM 5 cannot be continued. Thus, in a case where the output voltage of the super capacitor 11 is determined to be a threshold or less, the memory system 1 detects a decrease in the remaining power and, even in the DEVSLP mode, switches the control signal S62 to the high level and causes the switching devices 81d and 81e to be in the On state so as to connect the host device 2 and the super capacitor 11, thereby charging the super capacitor 11.

For example, in a case where the fuse 10 blows or a power failure occurs, there are cases where the memory system 1 according to the second embodiment transits to a state (power supply cut-off state) in which the supply of power from the host device 2 as an external power supply to the power supply circuit 8 is completely cut off. The V.DET 9b, in a case where the output voltage of the host device 2 for the power supply circuit 8 is determined to be a threshold or less, detects such a power supply cut-off state. In such a case, the V.DET 9b switches the control signal S70 and the EN signal S71 to the low level and transmits a result of the detection of the power supply cut-off state to the GPIO 73.

When the control signal S70 is switched to the low level, the switching devices 81c and 81e are switched from the On state illustrated in FIG. 5 to the Off state. When the control signal S70 is switched to the low level, the switching device 81f is switched from the Off state illustrated in FIG. 5 to the On state. When the EN signal S71 is switched to the low level, the converter 86 is switched to the conductive state. Thus, the super capacitor 11 and the LDO 83b are connected, and the power supply source of the system 72 and the GPIO 73 to which power is supplied through the LDO 83b is switched from the host device 2 to the super capacitor 11. For this reason, even when the memory system 1 transits to the power supply cut-off state, the system 72 and the GPIO 73 continue to operate, the remaining power of the super capacitor 11 is monitored by the GPIO 73, and the DC/DC converters 82a and 82b can be controlled by the system 72.

In the normal mode, when the power supply cut-off state is detected, the memory system 1 according to the second embodiment operates to copy the management data from the DRAM 5 to the NAND memory 4. Even when the memory system 1 transits to the power supply cut-off state as above, the system 72 performs control of the DC/DC converters 82a and 82b to be in the conductive state. For this reason, even in the power supply cut-off state, the NAND memory 4, the other components (the processor 71, the DRAM I/F 75, and the like) of the controller 7, the NAND I/F 74, and the DRAM 5 operate by receiving the supply of power from the super capacitor 11. In addition, the GPIO 73 transmits a result of the detection of the power supply cut-off state that is transmitted from the V.DET 9b to the processor 71 through the internal bus B1. When a notification of the detection of the power supply cut-off state is received, the processor 71 transmits a data copy command for copying data (the writing data, the management data, and the like) stored in the DRAM 5 to the NAND memory 4 to the NAND I/F 74 and the DRAM I/F 75. When the command is received, the NAND I/F 74 and the DRAM I/F 75 copies the data from the DRAM 5 to the NAND memory 4 in accordance with the command. When the copy operation is completed, the system 72 stops the supply of power from the super capacitor 11 to the NAND memory 4, the other components (the processor 71, the DRAM I/F 75, and the like) of the controller 7, the NAND I/F 74 and the DRAM 5 by performing control of the DC/DC converters 82a and 82b to be in the non-conductive state.

On the other hand, when the power supply cut-off state is detected in the DEVSLP mode, the memory system 1 maintains the supply of power from the super capacitor 11 to the DRAM 5 by performing control of the switching device 81b to be in the second switching state, thereby continuously maintaining the management data in the DRAM 5 using the power supplied from the super capacitor 11.

When the output voltage from the host device 2 for the power supply circuit 8 is detected to have exceeded the threshold, the V.DET 9b determines that the power supply cut-off state is released and switches the control signal S70 and the EN signal S71 to the high level. When the control signal S70 is switched to the high level, the switching devices 81c and 81e are switched from the Off state to the On state illustrated in FIG. 5. When the control signal S70 is switched to the high level, the switching device 81f is switched from the On state to the Off state illustrated in FIG. 5. When the EN signal S71 is switched to the high level, the converter 86 is switched to the non-conductive state. Accordingly, the power supply source of the system 72 and the GPIO 73 is switched from the super capacitor 11 to the host device 2.

When the power supply cut-off state is detected in the DEVSLP mode, the memory system 1 according to the second embodiment, in order to appropriately protect the management data stored in the DRAM 5, can operate to copy the management data from the DRAM 5 to the NAND memory 4 by consuming the power of the super capacitor 11. More specifically, in a case where output voltage information of the super capacitor 11 is received from the V.DET 9a in the middle of the power supply cut-off state in the DEVSLP mode, the GPIO 73 outputs the voltage information to the system 72 through the internal bus B1. In a case where the output voltage of the super capacitor 11 is determined to be the threshold or less based on the voltage information, the system 72 switches the EN signal S1 to the high level so as to cause the DC/DC converter 82a to be in the conductive state. When the EN signal S1 is switched to the high level, the DC/DC converter 82a switches the EN signal S2 to the high level so as to cause the DC/DC converter 82b to be in the conductive state. In the power supply cut-off state in the middle of the DEVSLP mode, as described above, the converter 86 is in the conductive state, and the switching device 81f is in the On state. Accordingly, the NAND memory 4, the other components (the processor 71, the DRAM I/F 75, and the like) of the controller 7, and the NAND I/F 74 are connected to the super capacitor 11 through the DC/DC converters 82a and 82b and operate by receiving the supply of power from the super capacitor 11. When operating by receiving the supply of power as above, the processor 71 transmits a data copy command for copying the management data stored in the DRAM 5 to the NAND memory 4 to the NAND I/F 74 and the DRAM I/F 75. When the command is received, the NAND I/F 74 and the DRAM I/F 75 copy the management data from the DRAM 5 to the NAND memory 4 in accordance with the command.

The threshold of the output voltage of the super capacitor 11 is set to a voltage value for which the management data stored in the DRAM 5 can be copied to the NAND memory 4 using the remaining power of the super capacitor 11. For this reason, the management data can be appropriately protected before the management data cannot be maintained in the DRAM 5 due to a decrease in the remaining power of the super capacitor 11 as the power supply cut-off state lasts for a long time.

When the memory system 1 transits to the normal mode, the DC/DC converters 82a and 82b, similar to the first embodiment, transit to the conductive state based on the EN signals S1 and S2 of the high level. In addition, when the memory system 1 transits from the DEVSLP mode to the normal mode, the system 72 switches the switching devices 81b, 81d, and 81e from the Off state or the second switching state to the On state illustrated in FIG. 5 or the first switching state by switching the control signals S61 and S62 output from the GPIO 73 to the high level. When these switching devices 81b, 81d, and 81e are switched to the On state or the first switching state, the LDO 83a is caused not to be connected to the super capacitor 11 but is connected to the DC/DC converter 82a, and similar to the first embodiment, receives the supply of power from the host device 2 through the DC/DC converter 82a. Also in the normal mode, the switching device 81c is controlled to be in the On state and enables the supply of power from the host device 2 to the DC/DC converters 82a and 82b and the LDO 83b. In addition, also in the normal mode, the switching device 81f is controlled to be in the Off state.

In the normal mode, since the switching devices 81c to 81e are controlled to be in the On state, the super capacitor 11 is connected to the host device 2 through the charger 85 and is charged by receiving the supply of power from the host device 2. Through such a charging process, the super capacitor 11 can recover the remaining power lowered in the DEVSLP mode or the like.

According to the second embodiment, when transiting to the DEVSLP mode, the memory system 1 stops the supply of power from the host device 2 to the DRAM 5, the NAND memory 4, the NAND I/F 74, and the other components of the controller 7 and supplies power from the super capacitor 11 to the DRAM 5. Accordingly, similar to the first embodiment, in order to suppress the power consumption of the host device 2, even when the supply of power from the host device 2 to the DRAM 5 is cut off, the memory system 1 maintains the management data continuously in the DRAM 5 without copying the management data stored in the DRAM 5 into the NAND memory 4, whereby loss of the data can be prevented.

In addition, according to the second embodiment, when the power supply cut-off state is detected in the DEVSLP mode, the memory system 1 supplies power from the super capacitor 11 to the GPIO 73 and the system 72. Accordingly, even when transiting to the power supply cut-off state, the memory system 1 monitors the remaining power of the super capacitor 11 by operating the system 72 and the GPIO 73, whereby the DC/DC converters 82a and 82b can be controlled.

Furthermore, according to the second embodiment, in a case where the output voltage of the super capacitor 11 that is monitored through the V.DET 9a is determined to be the threshold or less even when the memory system 1 transits to the power supply cut-off state, the memory system 1 copies the management data stored in the DRAM 5 into the NAND memory 4 by consuming the power of the super capacitor 11. Accordingly, even in a case where the power supply cut-off state lasts for a long time, the memory system 1 can appropriately protect the management data stored in the DRAM 5 before the remaining power of the super capacitor 11 becomes insufficient.

Third Embodiment

Figure 6:
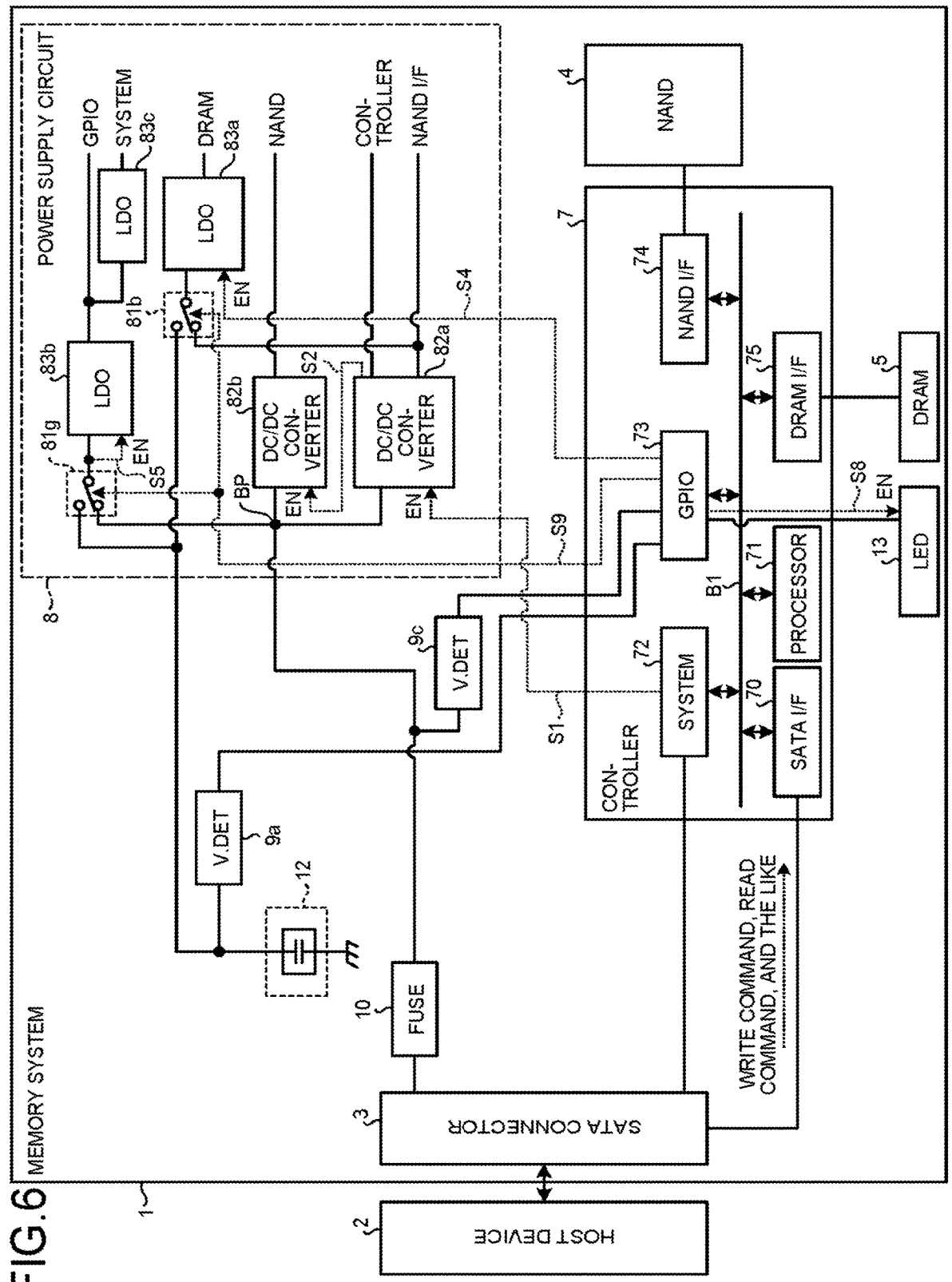
FIG. 6 is a block diagram that illustrates the configuration of a memory system according to a third embodiment.

FIG. 6 is a block diagram that illustrates the configuration of a memory system 1 according to a third embodiment. According to the third embodiment, while the memory system 1 does not respond to a DEVSLP mode but protects data stored in a DRAM 5 even when a transition to a state in which the supply of power from an external power supply to a power supply circuit 8 is completely cut off is made. Hereinafter, the same reference numeral will be assigned to the same configuration as that of the first embodiment, and duplicate description thereof will not be presented.

As illustrated in FIG. 6, the memory system 1 according to the third embodiment includes: a primary battery 12 as an internal power supply; a V.DET 9c; and an LED device 13 as an alert display unit. The primary battery 12 serves as an internal power supply replacing the capacitor 6 according to the first embodiment. For example, the primary battery 12 is a button-type battery. The primary battery 12 is not connected to a SATA connector 3.

The V.DET 9c is connected between a fuse 10 and a power supply circuit 8 (a path connecting DC/DC converters 82a and 82b and an LDO 83b to the fuse 10), monitors the output voltage of a host device 2 for the power supply circuit 8, and outputs a monitoring result thereof to the GPIO 73.

The LED device 13 has an LED built therein and, when an EN signal S8 to be described later is switched to the high level, turns on the LED so as to display an alert for promoting the replacement of the primary battery 12. The LED is attached to a position that is viewable from a user, and the LED device 13 turns off the LED when the EN signal S8 is switched to the low level.

The power supply circuit 8 according to the third embodiment includes a switching device 81g replacing the switching device 81a according to the first embodiment in addition to a switching device 81b. The switching device 81g is interposed between a branch point BP and the LDO 83b and the primary battery 12. The switching device 81g connects the LDO 83b and the SATA connector 3 in a first switching state illustrated in FIG. 6 and causes the LDO 83b and the primary battery 12 not to be connected to each other. To the contrary, in a second switching state not illustrated in FIG. 6, the switching device 81g causes the LDO 83b and the SATA connector 3 not to be connected to each other and connects the LDO 83b and the primary battery 12.

In the first switching state illustrated in FIG. 6, the switching device 81b according to the third embodiment connects the LDO 83a and the DC/DC converter 82a and causes the LDO 83a and the primary battery 12 not to be connected to each other. To the contrary, in a second switching state not illustrated in FIG. 6, the switching device 81b causes the LDO 83a and the DC/DC converter 82a not to be connected to each other and connects the LDO 83a and the primary battery 12.

The V.DET 9a according to the third embodiment is connected between the power supply circuit 8 and the primary battery 12, monitors the output voltage of the primary battery 12, and outputs a monitoring result thereof to the GPIO 73.

There are cases where the memory system 1 transits to a state (power supply cut-off state) in which the supply of power from the host device 2 to the power supply circuit 8 is cut off. In such cases, it is necessary to protect data (writing data, management data, and the like) stored in the DRAM 5. When the power supply cut-off state is detected, the memory system 1 according to the third embodiment switches the power supply source of the NAND memory 4, the DRAM 5, and the controller 7 from the host device 2 to the primary battery 12, thereby protecting the data stored in the DRAM 5. The GPIO 73 outputs a control signal S9 switched between the high level and the low level to the switching devices 81b and 81g. In a case where the output voltage of the host device 2 for the power supply circuit 8 that is monitored through the V.DET 9c is determined to be a threshold or less, the GPIO 73 detects the power supply cut-off state and switches the control signal S9 to the low level.

When the control signal S9 is switched to the low level, the switching devices 81b and 81g are switched from the first switching state illustrated in FIG. 6 to the second switching state. When the switching devices 81b and 81g are switched to the second switching state, the LDO's 83a and 83b are connected to the primary battery 12 and receive supply of power from the primary battery 12. Accordingly, when the supply of power is received through the LDO's 83a and 83b, the power supply source of the DRAM 5, the system 72, and the GPIO 73 is switched to the primary battery 12.

Even in the power supply cut-off state, the LDO 83a maintains the conductive state and supplies power delivered from the primary battery 12 to the DRAM 5. Thus, as long as the supply of power is received from the primary battery 12, the DRAM 5 performs a refreshing operation using the power, the data stored in the DRAM 5 is continuously maintained, whereby loss of the data can be prevented. In addition, even in the power supply cut-off state, the LDO's 83b and 83c maintain the conductive states. Accordingly, the system 72 and the GPIO 73 operate by receiving the supply of power from the primary battery 12.

As the primary battery 12 supplies the power to the DRAM 5, the system 72, and the GPIO 73, the remaining power thereof is lowered. The GPIO 73 receives a monitoring result of the output voltage of the primary battery 12 from the V.DET 9a and determines the output voltage to be a threshold or less, thereby detecting a decrease in the remaining power. The GPIO 73 outputs an EN signal S8 switched between the high level and the low level to the LED device 13 and, in a case where the output voltage of the primary battery 12 is a threshold or less, switches the EN signal S8 to the high level. When the EN signal S8 is switched to the high level, the LED device 13 turns on the LED built in the LED device 13, thereby allowing the user to recognize an alert for promoting the replacement of the primary battery 12. When the output voltage of the primary battery 12 is above the threshold, the GPIO 73 switches the EN signal S8 to the low level, thereby turning off the LED of the LED device 13.

When the output voltage of the host device 2 for the power supply circuit 8 that is monitored through the V.DET 9c is determined to be above the threshold, the GPIO 73 determines that the power supply cut-off state is released and switches the control signal S9 to the high level. When the control signal S9 is switched to the high level, the switching devices 81b and 81g are switched from the second switching state to the first switching state illustrated in FIG. 6. When these switching devices 81b and 81g are switched to the first switching state, the LDO's 83a and 83b are caused not to be connected to the primary battery 12 and are connected to the host device 2 through the SATA connector 3. In the state in which the power supply cut-off state is released, the LDO's 83a to 83c and the DC/DC converters 82a and 82b are controlled to be in the conductive state. Accordingly, the NAND memory 4, the DRAM 5, and the controller 7 receive the supply of power from the host device 2.

According to the third embodiment, when the power supply cut-off state is detected, the memory system 1 supplies power from the primary battery 12 to the DRAM 5. Thus, even when a transition to the power supply cut-off state is made, the memory system 1 continuously maintains the data, which is stored in the DRAM 5, in the DRAM 5, thereby preventing loss of the data.

Fourth Embodiment

Figure 7:
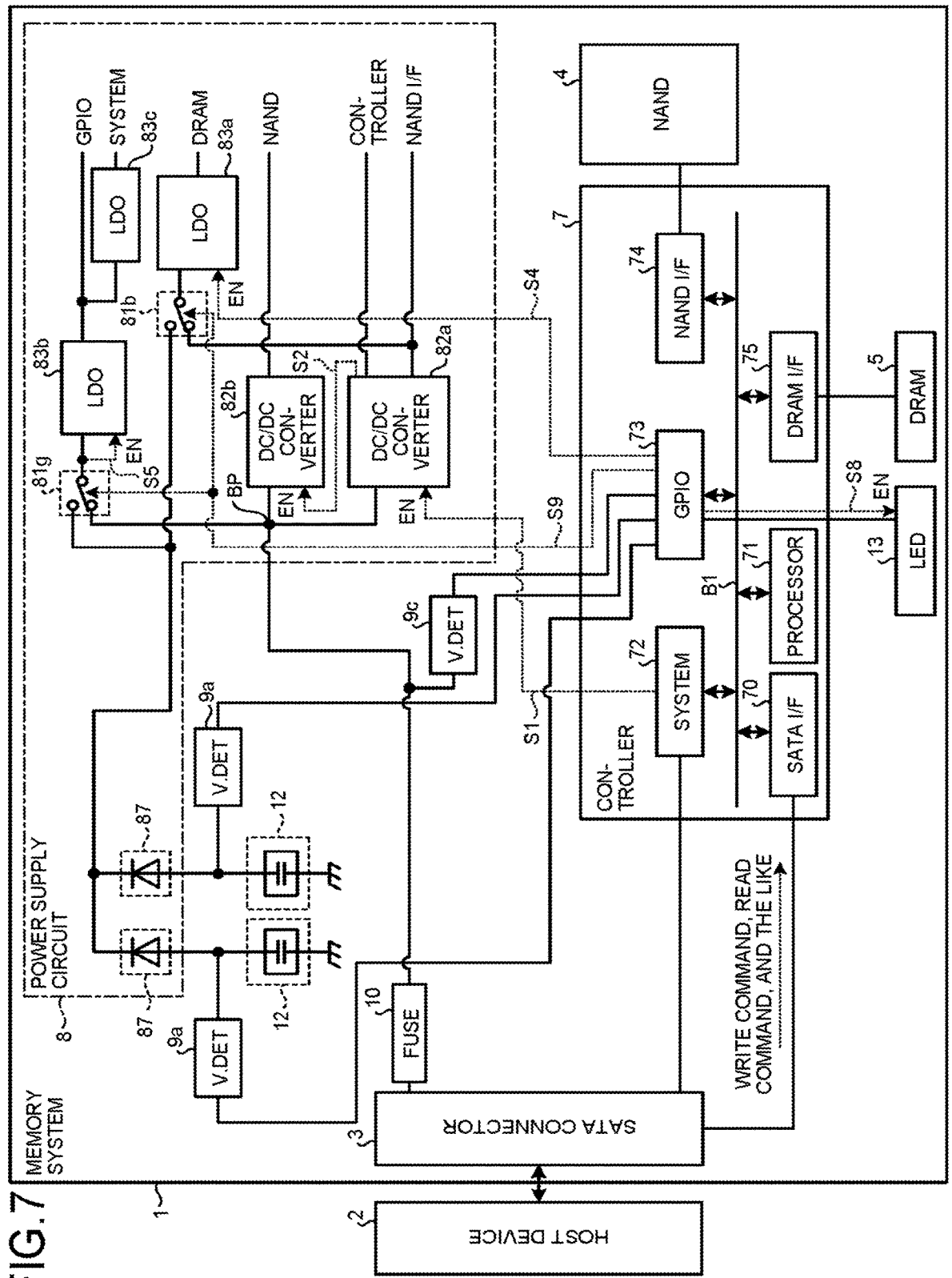
FIG. 7 is a block diagram that illustrates the configuration of a memory system according to a fourth embodiment.

FIG. 7 is a block diagram that illustrates the configuration of a memory system 1 according to a fourth embodiment. The memory system 1 according to the fourth embodiment, compared to the memory system 1 according to the third embodiment, has a superior power supply capability of the internal power supply. Hereinafter, the same reference numeral will be assigned to the same configuration as that of the first or third embodiment, and duplicate description thereof will not be presented.

As illustrated in FIG. 7, the memory system 1 according to the fourth embodiment includes: a plurality of primary batteries 12 connected in parallel as internal power supplies; a plurality of diodes 87; and a plurality of V.DET's 9a, which is different from the memory system 1 according to the third embodiment.

Each diode 87 is connected to a corresponding primary battery 12 in series. Each diode 87 serves to enable the supply of power from a primary battery 12 that is connected thereto in series to LDO's 83a and 83b and to cut off the supply of power from a primary battery 12 connected thereto in parallel to the primary battery 12 connected thereto in series. Accordingly, even when the output voltages of the primary battery 12 are different from each other, the memory system 1 can appropriately supply power to the LDO's 83*a* and 83*b* without consuming power of the primary batteries 12 inside the plurality of primary batteries 12.

Each V.DET 9*a* is connected between the diode 87 and the primary battery 12 that are connected in series, monitors the output voltage of each primary battery 12, and outputs a monitoring result thereof to the GPIO 73.

When it is determined that any one of the output voltages of the plurality of the primary batteries 12, which are monitored through the plurality of V.DET's 9*a*, is determined to be a threshold or less, the GPIO 73 switches the EN signal S8 to the high level. When the EN signal S8 is switched to the high level, the LED device 13 turns on an LED built in the LED device 13, thereby allowing the user to recognize an alert for promoting the replacement of the primary battery 12. On the other hand, in a case where the output voltages of all the primary batteries 12 are above the threshold, the GPIO 73 switches the EN signal S8 to the low level, thereby turning off the LED of the LED device 13.

In a range illustrated in FIG. 7, while two primary batteries 12, two diodes 87, and two V.DET's 9*a* appear, the memory system 1 may be configured to include three or more primary batteries 12, three or more diodes 87, and three or more V.DET's 9*a*.

In the first switching state illustrated in FIG. 7, the switching device 81*g* connects the LDO 83*b* and the SATA connector 3 and causes the LDO 83*b* and the plurality of the primary batteries 12 not to be connected to each other. To the contrary, in the second switching state not illustrated in FIG. 7, the switching device 81*g* causes the LDO 83*b* and the SATA connector 3 not to be connected to each other and connects the LDO 83*b* and the plurality of the primary batteries 12.

In the first switching state illustrated in FIG. 7, the switching device 81*b* connects the LDO 83*a* and the DC/DC converter 82*a* and causes the LDO 83*a* and the plurality of the primary batteries 12 not to be connected to each other. To the contrary, in the second switching state not illustrated in FIG. 7, the switching device 81*b* causes the LDO 83*a* and the DC/DC converter 82*a* not to be connected to each other and connects the LDO 83*a* and the plurality of the primary batteries 12.

According to the fourth embodiment, since the memory system 1 includes the plurality of the primary batteries 12, there are more power supply sources of the DRAM 5, the system 72, and the GPIO 73 than those of the memory system 1 according to the third embodiment, and, even in the power supply cut-off state, power can be supplied to the DRAM 5, the system 72, and the GPIO 73 for a long time. In addition, since the memory system 1 includes the plurality of the primary batteries 12, the primary batteries 12 are replaced in turns, and accordingly, the power supply cut-off state can be further continued.

Fifth Embodiment

Figure 8:
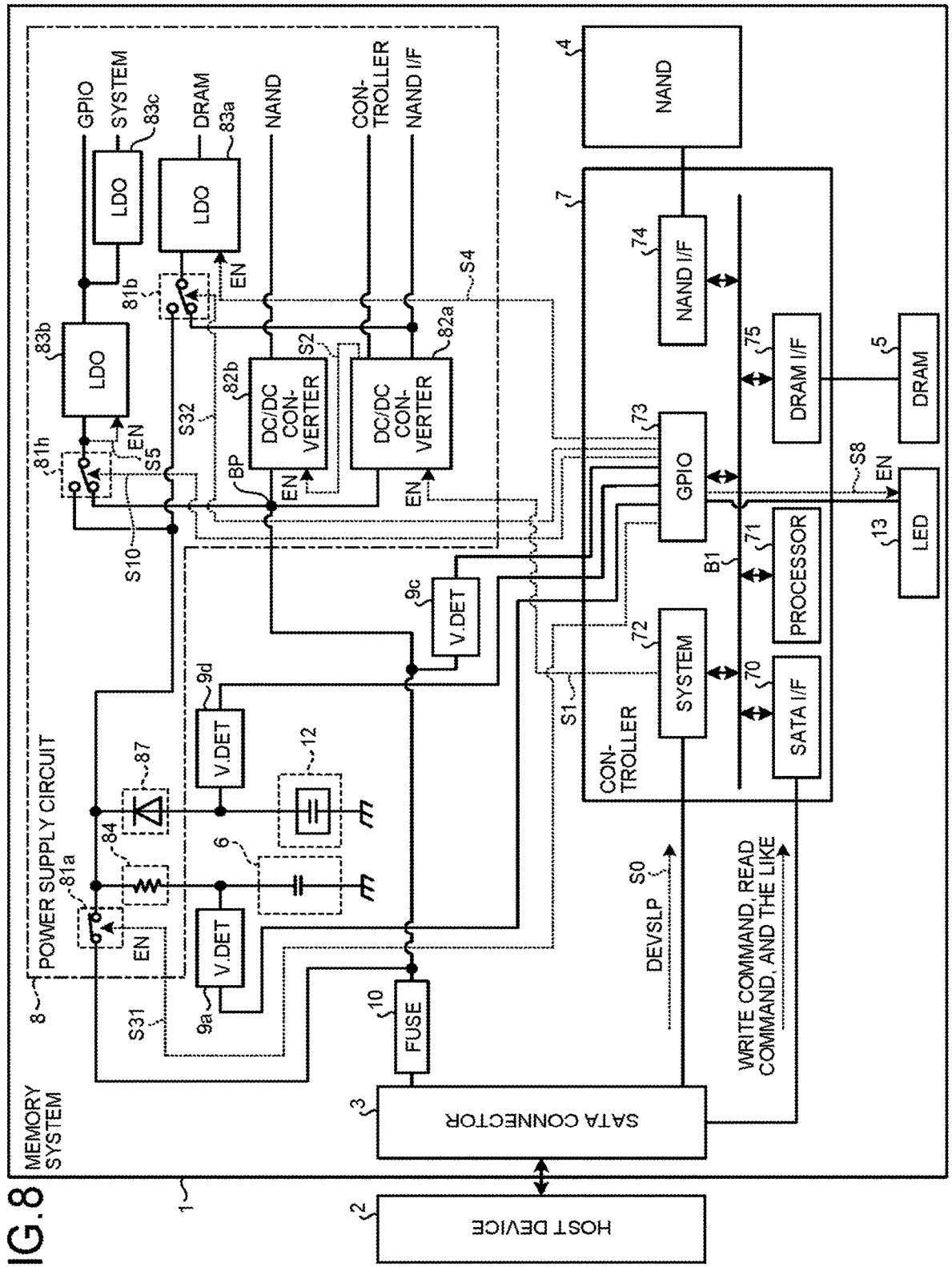
FIG. 8 is a block diagram that illustrates the configuration of a memory system according to a fifth embodiment.

FIG. 8 is a block diagram that illustrates the configuration of a memory system 1 according to a fifth embodiment. The memory system 1 according to the fifth embodiment not only responds to a DEVSLP mode but protects data stored in a DRAM 5 even when a transition to a state in which the supply of power from an external power supply (host device 2) to a power supply circuit 8 is completely cut off is made. Hereinafter, the same reference numeral will be assigned to the same configuration as that of the first embodiment, and duplicate description thereof will not be presented.

As illustrated in FIG. 8, the memory system 1 according to the fifth embodiment additionally includes a primary battery 12, V.DET's 9*c* and 9*d*, and an LED device 13 as an alert display unit in addition to the memory system according to the first embodiment.

The primary battery 12 serves as an internal power supply of the memory system 1 and is connected to a capacitor 6 in parallel. For example, the primary battery 12 is a button-type battery. The output voltage of the primary battery 12 is lower than the output voltage of the capacitor 6 that is sufficiently charged.

The V.DET 9*c* is connected between a fuse 10 and a power supply circuit 8 (a path connecting DC/DC converters 82*a* and 82*b* and an LDO 83*b* to the fuse 10), monitors the voltage that is supplied from a host device 2 for the power supply circuit 8, and outputs a monitoring result thereof to the GPIO 73.

The V.DET 9*d* is connected between the power supply circuit 8 and the primary battery 12, monitors the output voltage of the primary battery 12, and outputs a monitoring result thereof to the GPIO 73.

The LED device 13 has an LED built therein and, when an EN signal S8 to be described later is switched to the high level, turns on the LED so as to display an alert for promoting the replacement of the primary battery 12. The LED is attached to a position that is viewable from a user, and the LED device 13 turns off the LED when the EN signal S8 is switched to the low level.

The power supply circuit 8 according to the fifth embodiment, compared to that of the first embodiment, additionally includes a switching device 81*h* and a diode 87. The switching device 81*h* is interposed between the LDO 83*b* and the capacitor 6 and the primary battery 12 and a branch point BP. In a first switching state illustrated in FIG. 8, the switching device 81*h* connects the LDO 83*b* and the SATA connector 3 and causes the LDO 83*b* not to be connected to the capacitor 6 and the primary battery 12. To the contrary, in a second switching state not illustrated in FIG. 8, the switching device 81*h* causes the LDO 83*b* and the SATA connector 3 not to be connected to each other and connects the LDO 83*b* to the capacitor 6 and the primary battery 12. The switching device 81*h* is switched between the first switching state and the second switching state in accordance with the level of a control signal S10 that is output from the GPIO 73. The switching device B1*h* is in the first switching state illustrated in FIG. 8 in accordance with the control signal S10 of the high level and is in the second switching state in accordance with the control signal S10 of the low level. In the DEVSLP mode and the normal mode, the switching device 81*h* is in the first switching state in accordance with the control signal S10 of the high level.

In the On state illustrated in FIG. 8, the switching device 81*a* connects the capacitor 6 and the primary battery 12 to the SATA connector 3. To the contrary, in the Off state, the switching device 81*a* causes the capacitor 6 and the primary battery 12 not to be connected to the SATA connector 3.

In the first switching state illustrated in FIG. 8, the switching device 81*b* connects the LDO 83*a* and the DC/DC converter 82*a* and causes the LDO 83*a* not to be connected to the capacitor 6 and the primary battery 12. To the contrary, in the second switching state not illustrated in FIG. 8, the switching device 81*b* causes the LDO 83*a* and the DC/DC converter 82*a* not to be connected to each other and connects the LDO 83*a* to the capacitor 6 and the primary battery 12.

The diode 87 is connected to the primary battery 12 in series. The diode 87 serves to enable the supply of power from the primary battery 12 to the LDO's 83a and 83b and to cut off the supply of power from the capacitor 6 connected thereto in parallel to the primary battery 12. Accordingly, even when the output voltage of the capacitor 6 connected in parallel is higher than the output voltage of the primary battery 12, the power of the capacitor 6 is not consumed by the primary battery 12 but is appropriately supplied to the LDO's 83a and 83b.

When the memory system 1 transits to the DEVSLP mode, the DC/DC converters 82a and 82b, similar to the first embodiment, transit to the non-conductive state in accordance with EN signals S1 and S2 of the low level.

In addition, when the memory system 1 transits to the DEVSLP mode, control signals S31 and S32, similar to the first embodiment, are in the low level and causes the switching devices 81a and 81b to be switched to the On state illustrated in FIG. 8 or the first switching state to the Off state or the second switching state.

When the switching devices 81a and Bib are switched to the Off state or the second switching state, the capacitor 6 and the primary battery 12 are connected to the LDO 83a. As described above, the output voltage of the primary battery 12 is lower than the output voltage of the capacitor 6 that is sufficiently charged. Thus, until the output voltage of the capacitor 6 is lowered to be the output voltage of the primary battery 12 or less, the primary battery 12 does not serve as a power supply source of the LDO 83a and does not consume power. Accordingly, in a state in which the capacitor 6 is sufficiently charged, the DRAM 5 receives the supply of power from the capacitor 6 through the LDO 83a. By receiving the supply of power as above, the DRAM 5, in the DEVSLP mode, performs a refreshing operation using the power and continuously maintains the management data without copying the management data to the NAND memory 4, thereby preventing loss of the data.

In the DEVSLP mode, in a case where the output voltage of the capacitor 6 that is monitored through the V.DET 9a and the GPIO 73 is determined to be a threshold or less, the system 72 outputs a control signal (not illustrated in the figure) of the high level to the switching device 81a so as to cause the switching device 81a to be in the On state and connects the host device 2 and the capacitor 6, thereby charging the capacitor 6. By employing a value above the output voltage of the primary battery 12 as such a threshold, in the DEVSLP mode, the memory system 1 can maintain the output voltage of the capacitor 6 to be higher than the output voltage of the primary battery 12, whereby unnecessary power consumption of the primary battery 12 not corresponding to charging can be prevented.

When the memory system 1 transits to the normal mode, the DC/DC converters 82a and 82b, similar to the first embodiment, transit to the conductive state based on the EN signals S1 and S2 of the high level. In addition, when the memory system 1 transits to the normal mode, the switching devices 81a and 81b, similar to the first embodiment, are switched from the Off state or the second switching state to the On state illustrated in FIG. 8 or the first switching state in accordance with the control signals S31 and S32. When these switching devices 81a and 81b are switched to the On state or the first switching state, the LDO 83a is caused not to be connected to the capacitor 6 and the primary battery 12 and is connected to the DC/DC converter 82a. Accordingly, the DRAM 5 receives the supply of power from the host device 2 through the LDO 83a and the DC/DC converter 82a. By causing the switching device 81a to be in the On state, the capacitor 6 and the host device 2 are connected to each other, and the capacitor 6 is charged by receiving the supply of power from the host device 2.

There are cases where the memory system 1 transits to a state (power supply cut-off state) in which the supply of power from the host device 2 to the power supply circuit 8 is cut off. In such cases, it is necessary to protect data (writing data, management data, and the like) stored in the DRAM 5. When the power supply cut-off state is detected, the memory system 1 according to the fifth embodiment switches the power supply source of the DRAM 5, the system 72, and the GPIO 73 from the host device 2 to the capacitor 6 and the primary battery 12, thereby protecting the data stored in the DRAM 5. In a case where the output voltage of the host device 2 for the power supply circuit 8 that is monitored through the V.DET 9c is determined to be a threshold or less, the GPIO 73 detects the power supply cut-off state, switches the control signals S31 and S32 to the low level, outputs the control signals S31 and S32 to the switching devices 81a and 81b, switches the control signal S10 to the low level, and outputs the control signal S10 to the switching device 81h.

When the control signals S31, S32, and S10 are switched to the low level, the switching devices 81a, 81b and 81h are switched from the On state illustrated in FIG. 8 or the first switching state to the Off state or the second switching state. In the case of the DEVSLP mode, the switching devices 81a and 81b have already been switched to the Off state or the second switching state, and accordingly, even when the control signals S31 and S32 are switched to the low level, the switching devices 81a and 81b continuously remain to be in the Off state or the second switching state. When the switching devices 81a, 81b, and 81h are switched to the Off state or the second switching state, the LDO's 83a and 83b are connected to the capacitor 6 and the primary battery 12. The LDO's 83a and 83b receive the supply of power from one, of which the output voltage is higher, out of the capacitor 6 and the primary battery 12. Accordingly, the power supply source of the DRAM 5, the system 72, and the GPIO 73 that receive the supply of power through the LDO's 83a and 83b is switched to the capacitor 6 or the primary battery 12. In addition, as described above, in the state in which the capacitor 6 is sufficiently charged, the output voltage of the capacitor 6 is higher than the output voltage of the primary battery 12. Accordingly, until the output voltage of the capacitor 6 is lowered to be the output voltage of the primary battery 12 or less, the LDO's 83a and 83b receive the supply of power from the capacitor 6.

Even in the power supply cut-off state, the LDO 83a maintains to be in the conductive state and supplies power supplied from one, of which the output voltage is higher, out of the capacitor 6 and the primary battery 12 to the DRAM 5. As above, as long as the supply of power is received, the DRAM 5 performs a refreshing operation using the supplied power and continuously maintains data stored in the DRAM 5, thereby preventing loss of the management data. At this time, since the switching device 81a is in the Off state, the supply of power from the capacitor 6 or the primary battery 12 to the host device 2 is cut off, and unnecessary power consumption of the capacitor 6 and the primary battery 12 is prevented.

As the primary battery 12 supplies the power to the DRAM 5, the system 72, and the GPIO 73, the remaining power thereof is lowered. The GPIO 73 receives a monitoring result of the output voltage of the primary battery 12 from the V.DET 9d and determines the output voltage to be a threshold or less, thereby detecting such a decrease in the remaining power. The GPIC 73 outputs an EN signal S8 switched between the high level and the low level to the LED device 13 and, in a case where the output voltage of the primary battery 12 is a threshold or less, switches the EN signal S8 to the high level. When the EN signal S8 is switched to the high level, the LED device 13 turns on the LED built in the LED device 13, thereby allowing the user to recognize an alert for promoting the replacement of the primary battery 12. In addition, when the output voltage of the primary battery 12 is above the threshold, the GPIO 73 switches the EN signal S8 to the low level, thereby turning off the LED of the LED device 13.

When the output voltage of the host device 2 for the power supply circuit 8 that is monitored through the V.DET 9c is determined to be above the threshold, the GPIO 73 switches the control signals S31, S32, and S10 to the high level. When the control signals S31, S32, and S10 are switched to the high level, the switching devices 81a, 81b, and 81h are switched from the Off state or the second switching state to the On state illustrated in FIG. 8 or the first switching state. When these switching devices 81a, 81b, and 81h are switched to the On state illustrated in FIG. 8 or the first switching state, the LDO's 83a and 83b are caused not to be connected to the capacitor 6 and the primary battery 12 and are connected to the host device 2 through the SATA connector 3, thereby receiving the supply of power from the host device 2.

According to the fifth embodiment, when the power supply cut-off state is detected, the memory system 1 supplies power from the capacitor 6 or the primary battery 12 to the DRAM 5. Thus, the memory system 1 not only has the same advantage as that of the first embodiment and, even when a transition to the power supply cut-off state is made, continuously maintains the data, which is stored in the DRAM 5, in the DRAM 5, thereby preventing loss of the data.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a non-volatile memory;
a volatile memory that temporarily stores data to be written into the non-volatile memory;
an internal power supply;
a controller; and
a power supply circuit that includes a first low drop out (LDO) circuit, a DC/DC converter circuit, and a second low drop out (LDO) circuit, the first low drop out (LDO) circuit supplying a power supplied from a host device to the controller, the DC/DC converter circuit controlling on/off of power supply from the host device to the controller and the non-volatile memory, the second low drop out (LDO) circuit supplying either the power supplied from the host or a power supplied from the internal power supply to the volatile memory; wherein,
when receiving an instruction for a transition from a normal mode to a low power consumption mode from the host device, the controller controls the DC/DC converter and the second low drop out (LDO) circuit so that the power supply from the host device to the controller, the non-volatile memory, and the volatile memory is turned from on to off, and the power supply from the internal power supply to the volatile memory is turned from off to on, and the controller stores data received from the host to the non-volatile memory and temporarily stores data to be written into the non-volatile memory to the volatile memory.

2. The memory system according to claim 1, wherein the controller does not copy data stored in the volatile memory to the non-volatile memory when receiving the instruction for the transition.

3. The memory system according to claim 2, further comprising a connector that supplies power input from the host device to the power supply circuit and transmits, to the controller, the instruction for the transition received from the host device.

4. The memory system according to claim 3,
wherein the internal power supply is chargeable, and
wherein the power supply circuit supplies the power supplied from the connector to the internal power supply.

5. The memory system according to claim 4, wherein the internal power supply includes a capacitor.

6. The memory system according to claim 5, wherein the controller monitors an output voltage of the internal power supply, and controls the power supply circuit to supply the power supplied from the host device to the internal power supply when the output voltage is a threshold or less.

7. The memory system according to claim 6, wherein the controller includes a voltage detector that monitors the output voltage of the internal power supply.

8. The memory system according to claim 7,
wherein the controller includes a logic circuit that receives a first signal from the connector,
wherein the controller includes a volatile memory interface,
wherein the power supply circuit includes a converter that converts a voltage supplied from the host device and supplies the converted voltage to the volatile memory interface, and
wherein the logic circuit transmits a second signal to the converter based on the received first signal.

9. The memory system according to claim 8,
wherein the second signal includes a high level and a low level, and the logic circuit switches the second signal when the first signal includes the instruction for the transition, and
wherein the converter cuts off the supply of power to the volatile memory interface in accordance with the switching of the second signal.

10. The memory system according to claim 9,
wherein the non-volatile memory is a NAND type flash memory, and
wherein the volatile memory is a DRAM.

11. The memory system according to claim 4, wherein the controller copies data stored in the volatile memory to the non-volatile memory when an output voltage of the internal power supply becomes a threshold or less after the instruction for the transition is received.

12. The memory system according to claim 1, wherein the first low drop out (LDO) circuit supplies either the power supplied from the host or the power supplied from the internal power supply to the controller, wherein, when the power supplied from the host is cut off during the low power consumption mode, the controller controls the first and second low drop out (LDO) circuits and the DC/DC converter so that the power supply from the host device to the controller is turned from on to off, the power supply from the host device to the controller, the non-volatile memory, and the volatile memory is maintained in off, and the power supply from the internal power supply to the volatile memory is maintained in on.

13. The memory system according to claim 12, wherein the controller monitors an output voltage from the connector to the power supply circuit and determines that the power supply is cut off when the output voltage is a threshold or less.

14. The memory system according to claim 13, wherein the internal power supply includes a primary battery.

15. The memory system according to claim 14, wherein the primary battery is a button-type battery.

16. The memory system according to claim 15, further comprising a display unit, wherein the controller monitors an output voltage of the primary battery and displays an alert for urging to replace the primary battery on the display unit when the output voltage of the primary battery is the threshold or less.

17. The memory system according to claim 15, wherein the internal power supply includes a capacitor and supplies power from the capacitor to the volatile memory when an output voltage of the capacitor is the output voltage of the primary battery or more.

18. The memory system according to claim 17, wherein the power supply circuit includes a power supply path in which the power supplied from the connector is supplied to the capacitor.

19. The memory system according to claim 18, wherein the non-volatile memory is a NAND type flash memory, and wherein the volatile memory is a DRAM.

* * * * *